United States Patent [19]

Cafarelli et al.

[11] Patent Number: 5,134,416
[45] Date of Patent: Jul. 28, 1992

[54] SCANNING ANTENNA HAVING MULTIPATH RESISTANCE

[76] Inventors: Nicholas J. Cafarelli, 60 Audubon St., Springfield, Mass. 01108; Glen D. Adams, 4603 Marble Rock Ct., Chantilly, Va. 22021

[21] Appl. No.: 461,734
[22] Filed: Jan. 8, 1990
[51] Int. Cl.⁵ .................. H01Q 3/22; H01Q 3/24; H01Q 3/26
[52] U.S. Cl. ........................ 342/372; 342/408
[58] Field of Search ............... 342/372, 408

[56] References Cited

U.S. PATENT DOCUMENTS

| | | | |
|---|---|---|---|
| H,173 | 12/1986 | Claborn et al. | 342/372 |
| 3,922,680 | 11/1975 | Alsberg et al. | |
| 4,408,205 | 10/1983 | Hockham | |
| 4,811,022 | 3/1989 | Cafarelli et al. | 342/407 |
| 4,819,000 | 4/1989 | Meyer | 342/408 |
| 4,912,479 | 3/1990 | Nishimura et al. | 342/408 |

Primary Examiner—Theodore M. Blum

[57] ABSTRACT

The object of this invention is to reduce the adverse system performance effects resulting from antenna pattern sidelobes. It has particular application to the time reference scanning beam of the international microwave landing system (MLS) where sidelobe energy reflecting into the mainbeam at the receiver antenna introduces a timing measurement error. It also has application to systems such as height finding radar where signals entering through antenna pattern sidelobes degrade system performance. This invention describes methods and apparatus for system performance enhancement through the application of sidelobe amplitude and phase control.

10 Claims, 3 Drawing Sheets

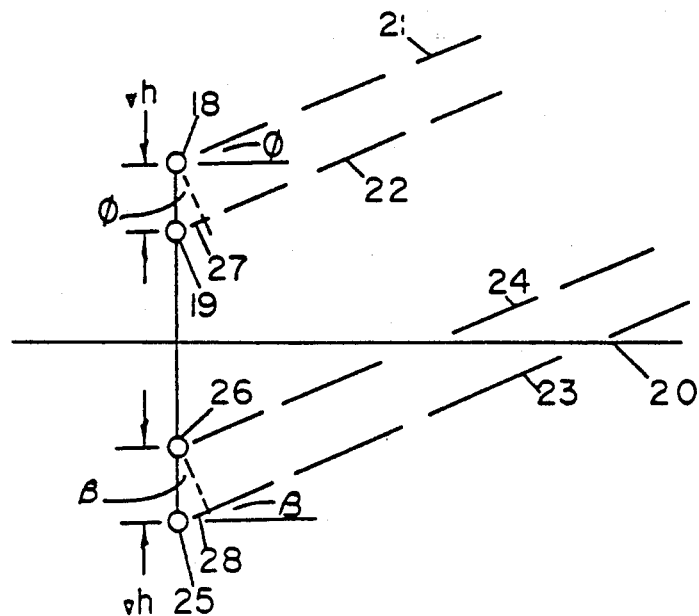
FIG. 5
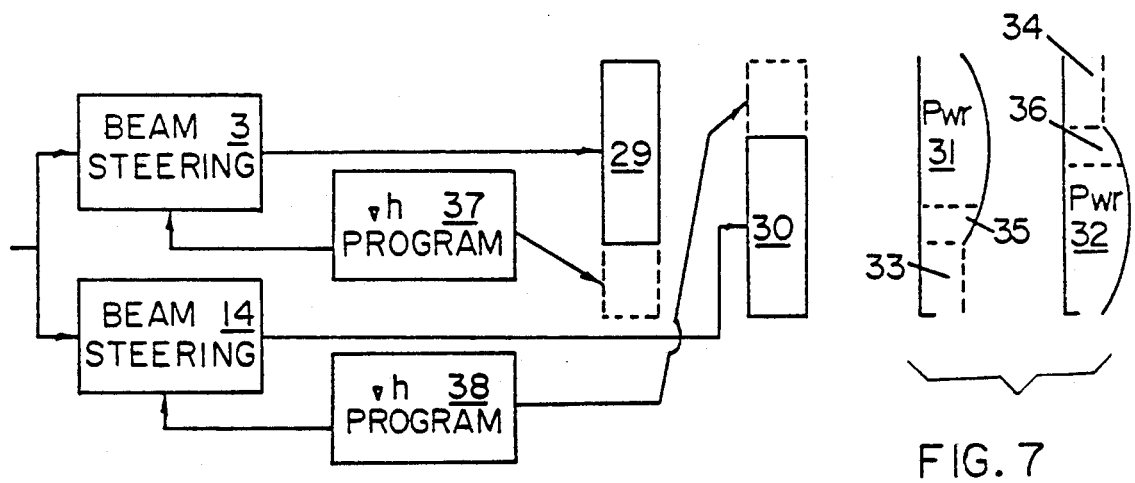
FIG. 6
FIG. 7
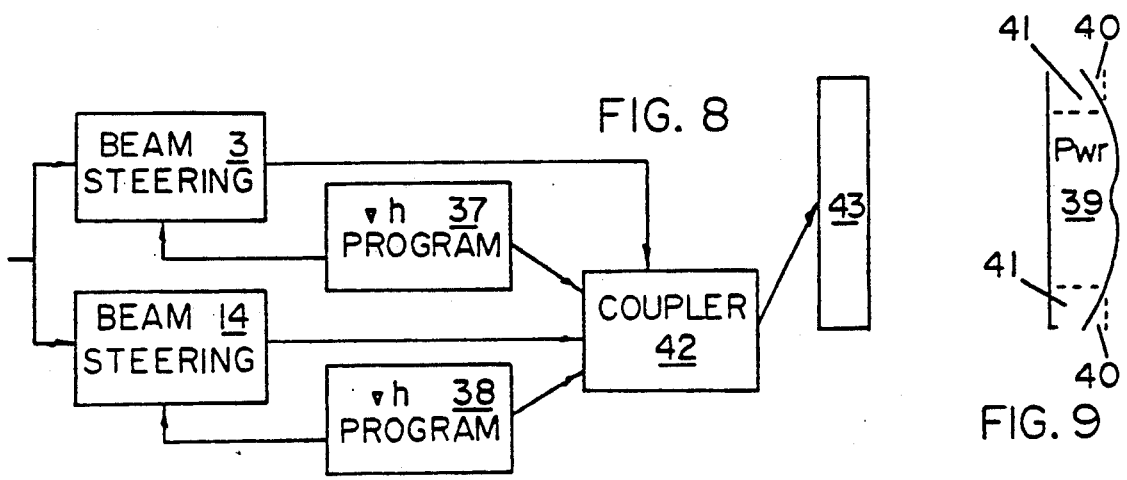
FIG. 8
FIG. 9

SCANNING ANTENNA HAVING MULTIPATH RESISTANCE

DESCRIPTION

1. Technical Field

This invention relates to electromagnetic radiation by scanning beam antennas, and in particular to a technique for reducing the magnitudes and effects of sidelobe radiation reflections that add vectorially to the direct path radiation.

2. Background Art

The art within which this invention arose is the microwave scanning beam art, such as that associated with the international microwave landing system (MLS). In time reference scanning beam systems, such as the MLS, the angular position of the transmitted beam centroid normally is determined by measuring the times that the leading and trailing edges of the beam illuminate the receiver antenna and calculating the average to represent the beam center. These measurements can be contaminated by mainlobe segments or by sidelobes of the transmitted pattern being reflected onto the mainlobe measurement threshold, either from the ground or from some object such as a hangar. This measurement error has an adverse effect on system performance. The inherent nature of the relationship of the direct mainlobe energy and both main and sidelobe reflected energy, is such that in the MLS an early time measurement error in the "TO" scan of a "TO"-"FRO" scan pair, is accompanied by a late time measurement error in the "FRO" scan, and vice-versa. The aircraft receiver decodes the angular position of the beam illuminating the aircraft by the measurement of the time between the "TO" beam passage and the "FRO" beam passage, where the "TO" beam scan sweeps from the start position to the maximum scan angle while the "FRO" beam scan returns the beam to the start position. Thus the "TO" error does not cancel the "FRO" error. The resulting error can cause undesirable flight path deviations, and undesirable motions of the aircraft control surfaces when the MLS is coupled to the autopilot for aircraft approach and landing.

The current approach to this error problem is to reduce the amplitude of the sidelobes relative to the mainlobe. This can be accomplished in a linear phased array antenna by providing preferred amplitude distributions among the radiating elements, or by individual element directivity.

Lopez, in U.S. Pat. No. 4,321,605 describes a reduced sidelobe amplitude antenna formed with element modules, each comprising two or more antenna element groups, and each group comprising one or more antenna elements. A signal supplied to any group is coupled to that module elements, but also coupled to selected elements in other modules.

Giannini, U.S. Pat. No. 3,903,524, describes the prior art of approximating a desired radiation pattern amplitude by using a combination of component antenna beams. The object of that invention is to provide an antenna aperture wherein the aperture does not have an area where there is substantial phase reinforcement of the combination of component aperture excitations.

Cafarelli and Adams U.S. Pat. No. 4,811,022 describes a reduction of MLS error caused by reflections into the mainlobe by reducing the effective, rather than the actual levels of reflected radiation.

The essence of that invention is to cause the reflection induced error during the "TO" scan to cancel the error induced during the "FRO" scan. This is accomplished by changing the antenna phase center height between the "TO" and "FRO" scans, that is, phase center diversity. This height change alters the transmit to the receive antenna path length difference between the direct and reflected signals. When the path length difference change corresponds to a half wavelength, reflected signals that previously added to, now subtract from the direct signal. This causes the reflection induced error in the beam centroid position to move in the same direction during the "TO" and "FRO" scans and thus have no effect on the time difference between the "TO" and "FRO" beam centroids. Thus the phase center height diversity of the MLS Elevation antenna between scans will cause the "TO" scan error to cancel the "FRO" scan error, negating the adverse error inducing effect of the reflection. For systems deriving data from a single scan or pulse such as a height finding radar, the phase center height diversity can be pulse to pulse or scan to scan with appropriate averaging.

Certain terms and phrases, well known in the electronic scanning beam art, are contained in the specification and claims of this patent. These terms and phrases now are defined to assure clarity.

a) The phrase "sidelobe structure" identifies the magnitude, shape, and angular position of all segments of the electromagnetic radiation emitted by the antenna, other than the mainlobe.

b) The phrase "the beamwidth ratios" refers to the half-power beamwidth of the main lobe of a first electromagnetic radiation pattern, divided by that of a second electromagnetic radiation pattern, c) The phrase "means to bias the centroid" of the main beam of an electromagnetic radiation pattern refers to means to move the cartesian center of power of the main lobe. The simplest and most obvious means to accomplish this is to change the power distribution to the radiating elements of the antenna, or to add and/or delete radiating elements.

d) The phrase "arbitrary reference plane" as used in this patent refers to any arbitrary reflecting surface, e.g., the ground or the side of a hanger, that reflects electromagnetic radiation emitted by the transmit antenna.

e) The phrase "receiver means" refers to any radio receiver capable of receiving and processing electromagnetic energy.

f) The phrase "the beamwidth control means" refers to any of the well known methods and apparatus for changing the width of the main lobe at its half-power point, e.g., lengthening or shortening the antenna aperture, or changing the power distribution to the antenna radiating elements.

DISCLOSURE OF INVENTION

This invention provides for the suppression of sidelobe induced errors by averaging/compensation achieved in the receiver processing the radiated beams, or in space after radiation, or virtually at the transmitter antenna as the beams are generated.

In the preferred embodiment, choosing a beamwidth and the power distribution across the array, produces a corresponding sidelobe structure. This relationship can finesse sidelobe multipath by reflecting a sidelobe null into the mainbeam when the mainbeam is in a desired position such as in MLS, pointing at the preferred descent angle. Thus on the preferred descent path, the receiver measures only the mainlobe, with the sidelobe contribution being from a null point.

Similarly the beamwidth can be changed an increment such that the sidelobe structure reflecting into the mainlobe shifts to an adjacent sidelobe on alternate scans or pulses. Adjacent sidelobes have opposite phase and one sidelobe would add to a mainlobe threshold measurement point, while the adjacent sidelobe would subtract from the measurement point, tending to cancel the error when averaged over a pair of scans or pulses.

A preferred antenna power distribution can be impressed on and radiated from a chosen antenna aperture for a preferred mainbeam width. The same preferred antenna power distribution can be impressed on a second antenna having a lesser aperture Applying the same source of electromagnetic radiation to both antennas for simultaneous radiation with correct phasing between the two antennas so the mainbeams are summing in phase, provides the adjacent sidelobe effect suppression in one scan or one pulse.

An economy of hardware is provided by summing the two separate antenna power distributions into one and using only one antenna to radiate the composite signal with sidelobe effect suppression.

Sidelobe effect suppression being provided by appropriate summation of sidelobes, a second antenna can simultainously generate a sidelobe like pattern which is out of phase with the sidelobes associated with the mainbeam from the first antenna. The relative power level applied to the second antenna is adjusted to match the second antenna sidelobe amplitude to the sidelobe amplitude of the first antenna, and being out of phase, summation provides sidelobe effect suppression.

This embodiment exploits an interest characteristic of microwave antennas, i.e. that even numbered sidelobes (e.g. 2nd, 4th, etc.),are in phase with the main lobe, and that odd number sidelobes (e.g. 1st, 3rd, etc.) are out-of-phase with the main lobe. Thus, when the radiation patterns of two antennas, when fed by the same energy source (i.e. the same transmitter as shown by FIG. 3) and thus being phase locked, but having different pointing angles, are superimposed such that even numbered sidelobes of a first antenna radiate at the same angle as odd numbered side lobes of a second antenna, then the vector addition of these sidelobes in space with either cancel or reduce the sidelobes of the aggregate pattern. This effect can be optimized by collocated antennas having the same beamwidth, with beam pointing angles offset by approximately one beamwidth, to achieve preferred superposition of the sidelobes.

Observing that adjacent sidelobes of an antenna have opposite phasing, a preferred antenna power distribution can be impressed on and radiated from a chosen antenna aperture with a mainbeam pointing bias to one side of the antenna boresight. The same preferred antenna power distribution can be impressed on a second antenna aperture with an equal mainbeam pointing bias to the other side of the second antenna boresight. Selecting the bias so corresponding adjacent sidelobes of the two antennas overlap in space and applying the same source of electromagnetic radiation to both antennas for simultaneous radiation with correct phasing between the two antennas so the mainbeams are summing in phase and adjacent sidelobes are summing out of phase, provides the adjacent sidelobe effect suppression in one scan or one pulse.

An economy of hardware is provided by summing the two separate antenna power distributions into one and using only one antenna to radiate the composite signal with sidelobe effect suppression.

Phase center height diversity produces compensating sidelobe reflection errors when averaging over two scans or two pulses such as "TO" scan and "FRO" scan of MLS. Simultaneous radiation from the two antennas at their respective phase center heights during one scan or one pulse adds the signals in space rather than in the receiver, providing compensation or averaging of multipath effects in the one scan or one pulse. The antenna power distribution is identical for each antenna and is typically chosen for efficiency and good sidelobe performance. The same transmitter drives both antennas and the relative phase between the two antennas is set so the mainlobes are radiated in phase. The phase center displacement provides path length differences for certain sidelobes in a manner to enhance the multipath control performance.

For a phase center height diversity antenna, the sidelobe performance enhancement for a particular location's MLS descent angle over a flat reflecting surface is a function of the phase center displacement where the displacement distance $$\Delta h = \lambda/(4 \sin \phi),$$

where $\lambda$ is the wavelength and $\phi$ is the elevation MLS descent angle. Thus as the descent angle increases the phase center displacement needs to decrease for the sidelobe performance enhancement to track the scanning beam position. This is accomplished as follows. Extend one end of each antenna by a number of elements equivalent to the phase center displacement so both antennas are equal in length, with tops and bottoms matching in height. With no radiation power applied to these added end elements, the patterns remain unchanged. The phase center of radiation, having equal moments about a point, remains unchanged. Add power, radiated from the added end elements, and the phase center of radiation moves down on the one antenna and up on the other antenna, so the phase center displacement is decreased. The amount of power is a function of the lever arm from the initial phase center and is made a function of the elevation scan angle so the sidelobe performance enhancement tracks the elevation scan. Alternately, if power is subtracted on the end instead of added, the phase centers will move in the opposite direction and the phase center displacement will increase. Thus the phase center can be moved electronically from the position established physically, with corresponding movement of the multipath control performance enhancement, which may be programmed to track the scanning mainbeam.

Economy of hardware is provided by merging, by suitable RF directional coupling devices, the two array-power distributions into one antenna for radiation. The phase center diversity relationship thus is maintained in the one antenna.

A further economy of hardware is provided by merging the two array-power distributions into one distribution applied to one antenna. The merging is done by summing the distributions element by corresponding height element, maintaining the phase center diversity. This new distribution is then designed into the feed network for the single array of elements.

To phase two antennas for in-phase radiation at elevation angle $\phi$, the phase difference between the centers is equivalent to $\Delta h \sin \phi$, where $\Delta h$ is the phase center displacement between the two antennas. The "image" antenna formed by the reflecting surface determines the corresponding sidelobes which will be reflected to the receiver at elevation angle $\phi$. There is a path length differential for the sidelobes from the upper and from the lower image antennas to the receiver at elevation angle $\phi$, which combined with the phasing between the antennas, results in the reflected sidelobe signal from one antenna compensating for the reflected sidelobe signal from the other antenna because they are out of phase.

In most elevation reflection cases this occurs at $\Delta h = \lambda/(4 \sin \phi)$. When the application is such that the angle of the undesired is not equidistant from the antenna boresight as is the main beam pointing angle, $\Delta h$ must be adjusted.

The sidelobe transmit antenna to receiver antenna path difference for the lower and upper antenna images is $\Delta h \sin \beta$ where $\beta$ is the angle of the sidelobe relative to boresight. When the phasing of the lower image antenna, equivalent to $\Delta h \sin \phi$, plus the path difference $\Delta h \sin \beta$, is equal to $\lambda/2$ the reflected sidelobes from the two antennas will be compensating when received at elevation angle $\phi$.

$$\Delta h \sin \phi + \Delta h \sin \beta = \lambda/2$$

$$\Delta h = \lambda/[2(\sin \lambda + \sin \phi)]$$

In most elevation reflection cases $\beta$ is considered equal to $\phi$, yielding $\Delta h = \lambda/(4\sin \phi)$. When the two angles are not the same such as with tilted ground for the transmitting case, or by reciprocity, a receiving array configured to block some strong in-frequency-band source from entering through the sidelobes, the full equation provides the correct phase center displacement.

This invention for multipath resistance or enhanced sidelobe multipath performance normally utilizes two or more initial antenna distributions/patterns which normally are considered to have "good" sidelobe multipath performance. Applying the techniques of this invention provides enhanced sidelobe multipath performance relative to a range of the sidelobe performance inherent in the initial patterns. Outside that range the sidelobe performance is no worse than in the initial patterns, except for the one case where one of the initial patterns is a lobing pattern without a mainbeam, where sidelobe performance may be enhanced on only one side of the mainbeam.

BRIEF DESCRIPTION OF DRAWINGS

FIG. 5 is the radiation geometry of two scanning beam antennas having different phase centers.

FIG. 6 shows a block diagram of a pair of antenna sub-systems with added end elements to achieve phase center motion.

FIG. 7 shows the power distribution into the radiating elements of the FIG. 6 antennas.

FIG. 8 shows a block diagram of a composite antenna system that integrates the two FIG. 6 antenna sub-systems.

FIG. 9 shows the power distribution into the radiating elements of the FIG. 8 composit antenna.

BEST MODE FOR CARRYING OUT THE INVENTION

Figure 1:
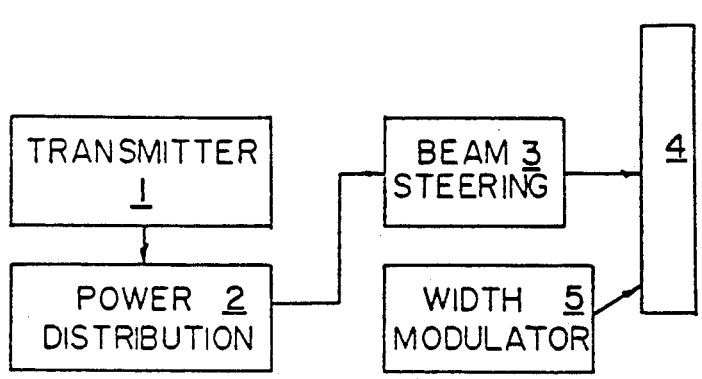
FIG. 1 shows a block diagram of a scanning beam antenna system having a beamwidth modulator.
Figure 2:
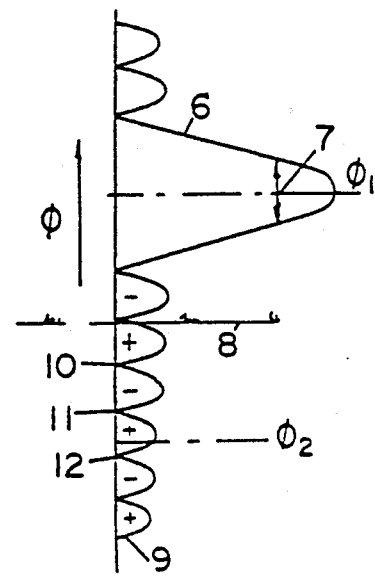
FIG. 2 is a cartesiam coordinate view of a scanning beam radiation pattern.

A scanning beam antenna system is illustrated by FIG. 1, which shows transmitter 1, feeding power distribution unit 2 and beam steering unit 3, activating antenna 4. The beam width modulator 5 of this preferred embodiment, changes the beamwidth and thus the positions of the sidelobes of the radiation pattern as a function of elevation angle $\phi$, to assure that a sidelobe null impinges on reflecting surfaces at all scanning beam angular positions. However, it is emphasized that other related embodiments described herein also assure that only sidelobe nulls impinge on reflecting surfaces. Still further related embodiments emphasize the applications of phase center diversity to cancel the adverse effects of sidelobe reflections. This discussion will use, but is not limited to, an MLS elevation function as an example. A cartesian plot of the far field elevation scanning beam pattern, see FIG. 2, shows main beam 6 having beamwidth 7 steered to a preferred descent angle $\phi$ above the reflecting plane 8 which is parallel to the ground, with a sidelobe structure 9 having normal alternating $+$ and $-$ phase sidelobes relative to the main beam. The sidelobe structure 9 will radiate into the ground and be reflected. In FIG. 2, $\phi_1$, represents the direct radiation received at the airborne antenna, and $\phi_2$ the radiation reflected from reflecting plane 8. By design choice of beamwidth 7, and sidelobe structure 9, placing sidelobe nulls 11 or 12 at the reflection angles of interest, the reflected energy contribution to the beam measurement thresholds are from null points.

In a modified embodiment, beamwidth modulator 5 is used to incrementally change beamwidth 7 which would change the sidelobe structure 9. This beamwidth modulator, shown as Width Modulator 5 in FIG. 1, as does any modulator, varies the value of its parameter as a function of time. This modulation, in turn, also varies the angular positions of the sidelobes and thus the angular positions of the sidelobe nulls. Since it is well known that the beamwidth of a radiation pattern emitted by an electronic scanning beam antenna varies inversely with its aperture, this modulator merely activates and deactivates selective end elements of the array. Of course, more sophisticated and probably more effective techniques could be applied, i.e. illuminating different segments of the array with modified power distributions. If on the "TO" scan, the negative phase sidelobe between nulls 10 and 11 were to reflect into the lower measurement point, the positive phase sidelobe between nulls 11 and 12 would reflect into the upper measurement point, shifting the beam centroid higher. For the "FRO" scan, after a beamwidth 7 decrease by modulator 5, the positive phase sidelobe between nulls 11 and 12 would reflect into the lower measurement point and the negative phase sidelobe beyond null 12 would reflect into the upper measurement point, shifting the beam centroid lower, whereby the average between the "TO" and "FRO" scans cancels the reflection effects.

Figure 3:
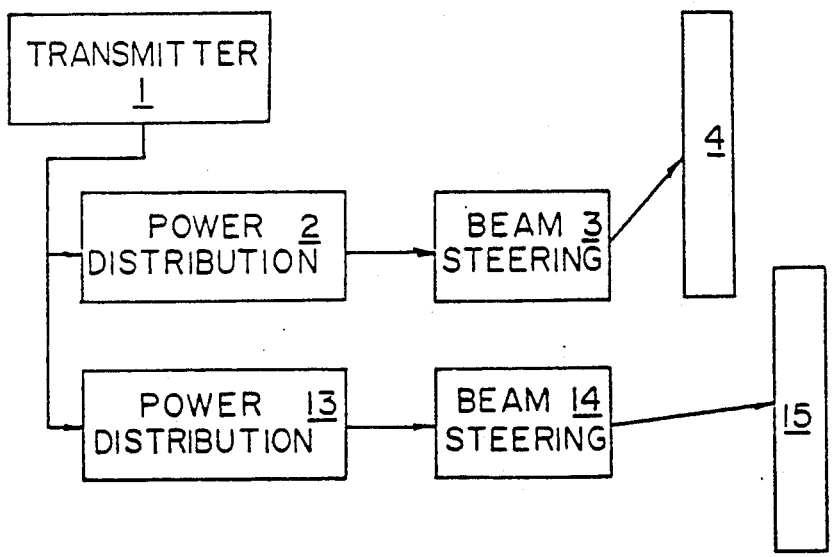
FIG. 3 shows a block diagram of a pair of antenna sub-systems having different beamwidths.
Figure 4:
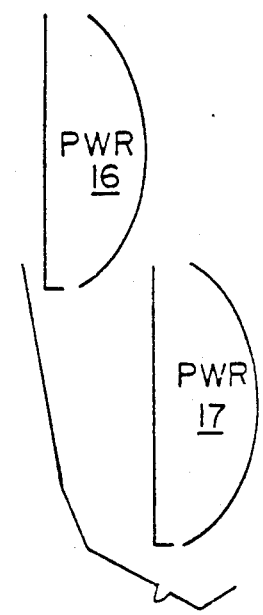
FIG. 4 shows the power distributions into the radiating elements of the FIG. 3 antennas.

The sidelobe effect suppression from beam width modulation may be obtained in one scan or one pulse using the configuration in FIG. 3 where transmitter 1 simultaneously drives beam steering units 3 and 14 which in turn drive antennas 4 and 15 respectively with power distributions 16 and 17 in FIG. 4. Beam steering unit 3 and antenna 4 are configured for the preferred beamwidth 7 while beam steering unit 14 and antenna 15 are configured for the same relative pattern except the beamwidth is an increment smaller and antenna 15 aperture is correspondingly larger. The relative phasing between the two RF paths is adjusted so the two main-beams are in phase and vectorially add in space. The sidelobes also vectorially add in space and as the phasing difference between the two sets of sidelobes increases with increasing angle from the mainlobe, the vector sum will be smaller, such that the averaging of multipath effects as described with beamwidth modulator 5 in FIG. 1 are obtained at the preferred reflection points. Eventually the sidelobes may come back in phase further from the mainbeam, but the composite sidelobes will not exceed the corresponding levels of either antenna 4 or antenna 15 relative to the respective mainlobe.

An economy of hardware is obtained by merging the outputs of beamsteering units 3 and 14 with a suitable rf coupling means to drive the one antenna 15. A further economy of hardware is obtained by merging the functions of beam steering units 3 and 14, and driving antenna 15 with the two virtual pattern composite distribution. (As described later in FIGS. 8 and 10).

Referring again to FIG. 3, to describe another related embodiment, transmitter 1 drives beam steering units 3 and 14, and respectively, antennas 4 and 15 simultaneously. Most of the radiating elements of antenna 15 are not used, and the application of energy to the effective elements results in a a substantial reduction in main beam energy, and a radiated lobing pattern approximating the sidelobe pattern or a portion of the sidelobe pattern radiated by antenna 4. Appropriate powering and phasing between the two antennas, and simultaneous radiation, results in a reduced sidelobe pattern.

An economy of hardware is obtained by merging the outputs of beamsteering units 3 and 14 with a suitable rf coupling means to drive the one antenna 15. A further economy of hardware is obtained by merging the functions of beam steering units 3 and 14, and driving antenna 15 with the two virtual pattern composite distribution. (As described later in FIGS. 8 and 10).

Referring again to FIG. 3, to describe another related technique, transmitter 1 drives beam steering units 3 and 14, and respectively, antennas 4 and 15 simultaneously with appropriate phasing so the mainbeams add in space. Power distribution units 2 and 13 are configured for the same preferred power distribution for the preferred antenna pattern. While electromagnetic energy normally is routed from its source to the radiating elements of an array either by waveguides or co-axial cables, the inventors prefer the use of the well known corporate waveguide structure. In this structure, a waveguide is connected to the energy source, that waveguide is branched into two waveguides, those two are branched into four, etc., and the final branches are connected to the radiating elements. Power distribution unit 2 and beam steering unit 3 are configured to bias the beam pointing angle of antenna 4 to one side of boresight and similarly power distribution unit 13 and beam steering unit 14 are configured to bias equally the beam pointing angle of antenna 15 to the other side of boresight. The bias is selected so the odd numbered sidelobes of antenna 4 and the even numbered sidelobes of antenna 15 overlap and vice versa, i.e., adjacent sidelobes occupy the same position in space. As adjacent sidelobes have opposite phasing, enhanced sidelobe performance is obtained as the signals subtract in space.

An economy of hardware is obtained by merging the outputs of beamsteering units 3 and 14 with a suitable rf coupling means to drive the one antenna 15. A further economy of hardware is obtained by merging the functions of beam steering units 3 and 14, and driving antenna 15 with the two virtual pattern composite distribution. (As described later in FIGS. 8 and 10).

Referring again to FIG. 3, to describe yet another related embodiment, transmitter 1 drives beam steering units 3 and 14, and respectively antennas 4 and 15. Antennas 4 and 15 are positioned so the phase centers are displaced a distance $\Delta h$. Antenna power distribution 16 for antenna 4 is the same as antenna power distribution 17 for antenna 15. The phasing between antennas 4 and 15 is set to $\Delta h \sin \phi$ where $\phi$ is the beam pointing angle of preferred interest. Sequential radiation of a "TO" scan from antenna 4 results in a multipath error contribution of K at preferred angle $\phi$, followed by a radiation of a "FRO" scan from antenna 15 with phase center diversity of $\Delta h$ results in a multipath error contribution of $-K$ at preferred angle $\phi$. The "TO" and "FRO" scans together compensate or average the two multipath errors in the receiver processor at preferred angle $\phi$. Simultaneous radiation yields the compensation or average during the radiation of the single scan, in space before the receiver.

FIG. 5 is a drawing of the geometry associated with two antennas with antenna phase centers 18 and 19 of antennas 4 and 15 separated by $\Delta h$ above a reflecting surface 20. The airborne antenna receives parallel direct rays 21 and 22 in the antenna far field at angle $\phi$ above the reference plane, which in this illustration is reflecting surface 20. Rays 23 and 24 are reflected parallel rays of sidelobes of antennas 4 and 15 at an angle B below the reference which are reflected to the airborne antenna from image phase centers 25 and 26 below reflecting surface 20, combining with direct rays 21 and 22 to form a composite signal that contains the sidelobe induced error. To form the main beam, the signals from antenna 4 and 15 must be in phase at the receiver in the far field, but path length 22 is longer than path length 21 by path length increment 27 which is $\Delta h \sin \phi$.

Therefore the signal from antenna 15 is provided with a phase offset to compensate for the additional path length. Looking at the sidelobe path lengths 23 and 24, using the image phase centers 25 and 26, path length 23 is longer than path length 24 by path length increment 28 which is $\Delta h \sin \beta$. The signal from image phase center 25, (the image of antenna 15), has a corresponding phase offset. When the sidelobe from image antenna phase center 26 is of equal amplitude and opposite phase of the sidelobe from image antenna phase center 25, (the image of antenna 4), the sidelobes contribution to the composite signal at angle $\beta$ will be compensating, or a net of zero. The opposite phase criteria sets:

$$(\Delta h \sin \phi + \Delta h \sin \beta) = \lambda/2$$

$$\Delta h = \lambda/[2(\sin \phi + \sin \beta)] \qquad \text{Eq 1}$$

where $\lambda$ is the signal wavelength. The equal amplitude results from being the same sidelobe from identical antenna distributions.

For the usual case where the reflecting surface (ground) is parallel to the reference of $\phi$ and $\beta$, $\phi$ and $\beta$ are equal and $$\Delta h = \lambda/(4 \sin \phi). \qquad \text{Eq 2}$$

Equation 1 applies in the general case such as when a strong in-frequency-band source is attempting to enter a receiving antenna through the sidelobe structure at angle $\beta$. Equation 2 shows that as the main beam pointing angle $\phi$ increases, the phase center displacement $\Delta h$ decreases to obtain compensating sidelobe effects performance.

FIG. 6 shows antenna 29 which is antenna 4 (from FIG. 3) with extra elements added to align the bottom of antenna 29 with the bottom of antenna 30; and antenna 30 is antenna 15 (from FIG. 3) with extra elements added to align with top of antenna 29. Antenna power distributions 31 and 32, similar to antenna distributions 16 and 17, are shown in FIG. 7. The antenna power distribution for antenna 29 is changed by $\Delta h$ programmer 37 and beam steering unit 3 to apply added power 33 to the added elements on the end of the antenna and likewise for $\Delta h$ programmer 38, beam steering unit 14 and power 34 for antenna power distribution 32 and antenna 30. These $\Delta h$ programmers move the phase center of the antenna by activating and de-activating selective radiating elements at the ends of the aperture. For example in a vertical linear array, elements near the lower end would be de-activated and/or those near the upper end activated to raise the phase center, and vice-versa to lower the phase center. The added power is a design parameter for a preferred distribution, but is shown here as an extension of the last element amplitude of distributions 31 and 32. The phase center of antenna 29 no longer corresponds to the phase center of antenna 4 as the added power to distribution 31 causes the center to shift downward, and similarly for distribution 32 and antenna 30, to shift upward. Clearly the amount of power applied and the distance from the original phase center are functions by which the $\Delta h$ programmer and beam steering unit can control the movement of the phase centers to track alignment of compensating sidelobe effects performance with the mainbeam as it is scanned upward.

Again, FIG. 7 shows antenna power distribution 31 which has been truncated on the lower side by $\Delta h$ programmer 37 and beam steering unit 3, subtracting power 35 to raise the phase center of antenna 29, and likewise for $\Delta h$ programmer 38, beam steering unit 14 and power 36, to lower the phase center of antenna 30, thereby increasing the $\Delta h$ phase center displacement for alignment for enhanced multipath performance at a lower mainbeam pointing angle. The main beam distortion caused by this slight power asymmetry is negligble. For the usual case with an MLS elevation antenna, the required alignment of sidelobe multipath reflection effect suppression is at an increasingly lower angle as the mainbeam is scanned higher.

Figure 10:
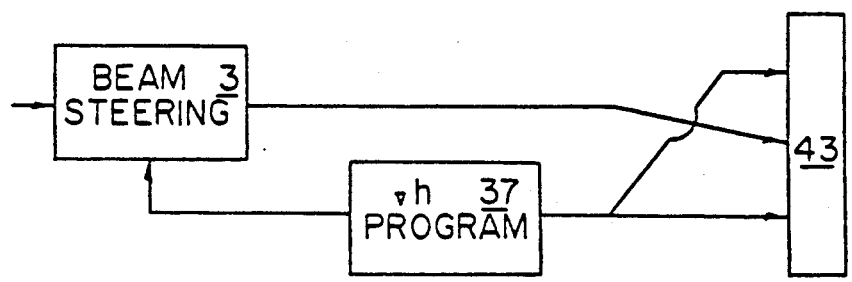
FIG. 10 shows a block diagram of an antenna system functionality equivalent to that of the FIG. 8 antenna system, with further electronic integration.

FIG. 8 shows how one antenna 43 replaces two antennas 29 and 30 of FIG. 6 by using coupler 42 which merges the outputs of beam steering unit 3 and $\Delta h$ programmer 37, and beam steering unit 14 and $\Delta h$ programmer 38, to drive the antenna 43 with the composite antenna power distribution 39 of FIG. 9, where adding power 40 decreases phase center displacement $\Delta h$ and subtracting power 41 increases phase center displacement $\Delta h$. A further economy of hardware, as shown by FIG. 10, is derived by considering that FIG. 6 antenna power distributions 31 and 32, or (31+33) and (32+34), or (31−35) and (32−36), can be summed together, maintaining the $\Delta h$ phase center diversity. Summed power distributions 31 and 32 yield a distribution for the nominal $\Delta h$ value, for the composite antenna power distribution 39, which may be modified by $\Delta h$ programmer 37 by power 41 or 42, thereby eliminating beam steering unit 13, coupler 42 and $=h$ programmer 38.

Figure 11:
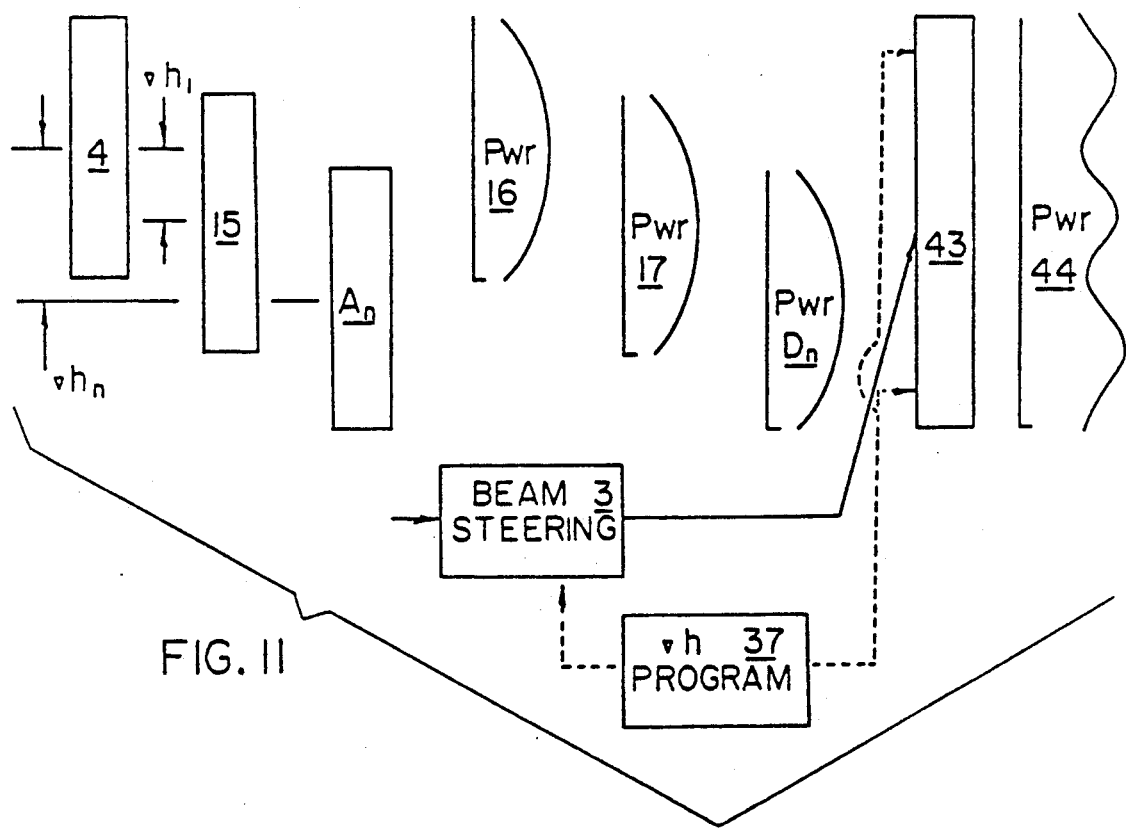
FIG. 11 shows a block diagram of an antenna system capable generating multiple phase centers, along with relevant power distributions.

FIG. 11 depicts multiple antennas 4, and 15 to An, with $\Delta h1$ to $\Delta hn$ and preferred antenna power distributions 16, and 17 to the nth distribution Dn, which are merged into one antenna 43 with composite antenna power distribution 44 where $\Delta h1$ to the nth increment $\Delta hn$ are phase center displacements for sidelobe multipath effect suppression corresponding to preferred scanning mainbeam pointing angles. Antenna 43 is driven by beam steering unit 3 and optionally by $\Delta h$ programmer 37 with distribution 44. The increments of $\Delta h1$ to $\Delta hn$ and the optional $\Delta h$ programming used are design parameters for optimum performance.

The methods and techniques herein described also are applicable to systems other than the MLS "TO"-"FRO" scanning beam sequence. For example, a related situation occurs when the angle is determined by angle signatures on the beam, e.g., if pulse spacing or amplitude modulated tones were a function of beam angle, these techniques will tend to suppress sidelobe related error contributions with proper parameter selection.

Consider a scanning beam radar, with either skin or beacon return. The target is illuminated by the mainbeam and may be illuminated by reflected sidelobes which may sum with the mainbeam in a destructive manner. The return of the target may enter the receive antenna directly and also through reflection, through the sidelobes which may distort the beam measurement centroid introducing error. The suppression of sidelobe effects can improve performance for both segments of the radar/target loop.

This embodiment of phase center diversity is called virtual phase center diversity (VPCD). It is noted that after the initial selection of the preferred antenna power distribution, application of VPCD does not affect the efficiency of directing radiated power into the mainlobe, but rather reduces the sidelobe effects by the interaction/summation of sidelobes from the virtual antennas embedded in the one antenna via this technique. The sidelobes can never be higher than those of the initially selected antenna power distribution because if the component sidelobes should be in phase when the mainlobes are phased for summation, the relative amplitude is maintained. In the more general case the sidelobes will not be directly in phase and so the effect will be diminished.

Other applications of the virtual phase center displacement technique and the other sidelobe effects suppression techniques described include receiving antenna systems required to block undesired signals arriving from prescribed directions. Likewise for a transmitting system, sidelobe effects suppression may be required to transmit very little energy into particular sectors.

We claim:

1. A scanning beam transmit antenna system comprising a first antenna sub-system and a second antenna sub-system with both antenna sub-systems scanning in the same plane and at the same beam pointing angles and each of said antenna sub-systems comprising:
   a source of electromagnetic energy;
   radiating antenna elements configured as an array to radiate a scanning beam;
   connecting means for connecting said source to said radiating elements;
   beam steering means to change the phases of the energy emitted by said radiating elements as a function of time to cause the said scanning beam to scan in space; and
   means to bias the power centroid of the main beam radiation by varying the array power distribution of the said first antenna sub-system relative to the array power distribution of the said second antenna sub-system by a bias distance $\Delta h = \lambda/[2(\sin\phi + \sin\beta)]$ where $\lambda$ is the wavelength of the radiation, $\phi$ is the angle between the beam pointing angle and an arbitrary reflection surface that reflects said electromagnetic radiation, and $\beta$ is the angle between the undesired radiation and said arbitrary reflection surface.

2. A scanning beam transmit antenna system as described by claim 1, wherein:
   said scanning beam scans in a vertical plane; said arbitrary reflecting surface is the ground; angle $\phi$ is substantially equal to angle $\beta$; and bias distance $\Delta h' = \lambda/(4 \sin\phi)$.

3. A scanning beam transmit antenna system as described by claim 1, wherein the said power centroid of said main beam radiation is varied by energizing radiating elements on one end of the array of said first antenna sub-system and on the opposite end of the array of said second antenna sub-system, and selectively energizing said added radiating elements.

4. A scanning beam transmit antenna system as described in claim 1 or 2 or 3, wherein said first antenna sub-system and said second antenna sub-system are integrated as a composite antenna system.

5. A scanning beam transmit antenna system as described by claim 1 having multiple antenna sub-systems, with means to bias said power centroid of the array power distribution of each antenna sub-system relative to the centroid of the array power distribution of the other antenna sub-systems.

6. A scanning beam transmit antenna system as described by claim 5 wherein said multiple antenna sub-systems are integrated as a composit antenna system.

7. A scanning beam transmit antenna system as described by claims 1 or 2 or 3 or 5 or 6, wherein said radiating elements are configured as a linear array to radiate a scanning beam.

8. A scanning beam transmit antenna system as described by claims 1 or 2 or 3 or 5 or 6, comprising also receiver means to detect and process reflected electromagnetic radiation returned from targets illuminated by said scanning beam transmit antennas.

9. A scanning beam transmit antenna system as described by claims 1 or 2 or 3 or 5 or 6, comprising also receiver means to detect and process electromagnetic radiation returned from a beacon transponder responding to an interrogation by said electromagnetic energy transmitted by said scanning beam antennas.

10. An antenna array system as described in claims 1 or 2 or 3 or 5 or 6, comprising electromagnetic energy detection means in lieu of electromagnetic energy radiating means.

* * * * *